March 31, 1931.                G. F. RUOPP                1,798,434
COMBINED FUEL AND PRESSURE GAUGE
Filed Sept. 14, 1927

Inventor
George F. Ruopp.
by Ruig & Hague, Attys.

Patented Mar. 31, 1931

1,798,434

UNITED STATES PATENT OFFICE

GEORGE FREDRICK RUOPP, OF MARSHALLTOWN, IOWA, ASSIGNOR TO MARSHALLTOWN MANUFACTURING COMPANY, OF MARSHALLTOWN, IOWA, A CORPORATION OF IOWA

COMBINED FUEL AND PRESSURE GAUGE

Application filed September 14, 1927. Serial No. 219,472.

This invention relates to gauges adapted to be used on liquid fuel tanks for determining the level of the fuel within the tank, and also the air pressure on the fuel.

The object of my invention is to provide a gauge designed to register both the fuel level and the pressure of the air within the tank, the gauge being so constructed and arranged that but a single opening need be provided in the tank for mounting the same, and further so arranged that the fuel index member, which is mounted outside of the tank, may be operated by mechanism from within the tank without the use of packing joints.

A further object is to provide means whereby a single dial may be utilized for the registration of both the fuel and pressure gauges.

A further object is to provide improved mechanism for operating the fuel index member.

My invention consists in the construction, arrangement and combination of the various parts of the device, whereby the objects contemplated are attained, as hereinafter more fully set forth, pointed out in my claim, and illustrated in the accompanying drawings, in which:

Figure 2:
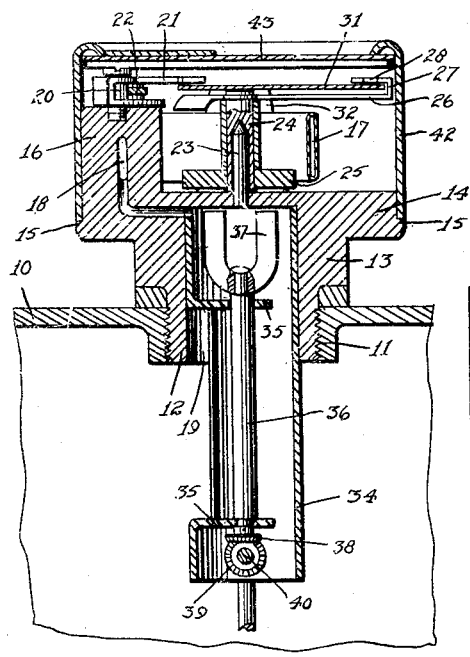
Figure 2 is a central, vertical, sectional view of the combined gauge.
Figure 1:
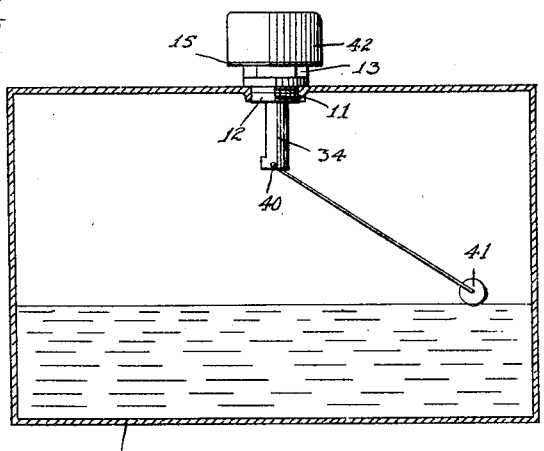
Figure 1 is a side elevation of my improved gauge showing the manner in which it is mounted in a fuel tank, said tank being shown in section.
Figure 3:
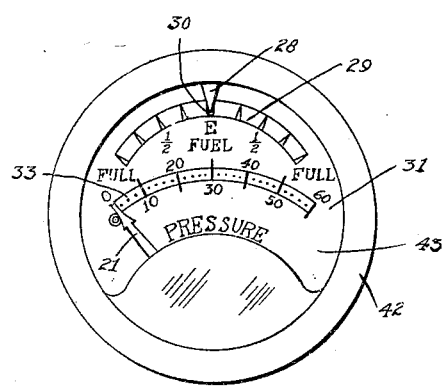
Figure 3 is a plan view of the dial and index members.
Figure 4:
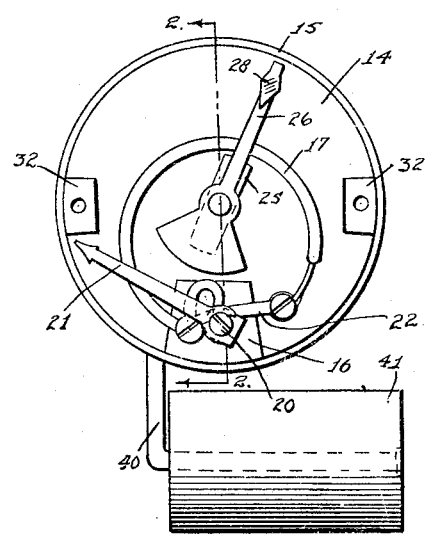
Figure 4 is a plan view of the gauge, with the shell which supports the window and the dial removed.

Referring to the drawings, I have used the reference numeral 10 to indicate a fuel tank, which may be of any desired cross section. The top of the tank is provided with a screw threaded opening 11 designed to receive the screw threaded stem 12 of my improved gauge, which comprises a hollow body member 13. Said body member is provided with a circular head 14, the circular face of which has near its lower edge a flange 15. The upper face of the member 12 is provided with an upright post 16 to which one end of a Bourdon tube 17 is connected. A passage 18 is provided for communicating the Bourdon tube with the interior opening 19 of the body portion. The post 16 is provided with an upright pivot pin 20 on which the index member 21 is pivotally mounted, said index being operated by means of the usual link connection 22 from the free end of the tube 17.

Extending upwardly from the center of the upper surface of the member 14 is a pivot pin 23 on which is rotatively mounted a sleeve 24, the lower end of which is provided with a magnetized bar 25, while the upper end is provided with an index member 26, provided at its free end with an upwardly extending portion 27 and an inwardly extending pointed portion 28 which serves as an index operating over the fuel scale 29. The said scale is preferably designed to have its zero or empty reading at its central portion at the point 30 and designed to be read in both directions. The said scale is mounted on a suitable dial 31 carried by upright posts 32 from the member 14, and secured in position by means of suitable screws. The index finger 21 is designed to operate over a pressure scale 33 which is graduated to represent pounds of pressure in the usual manner.

Supported within the opening 19 of the body portion 31 is a tubular frame 34, which extends downwardly into the tank 10 a considerable distance. One side of the frame 34 is cut away to provide inwardly extending lugs 35. A shaft 36 is rotatively mounted in said lugs and centrally within the tube 34. The upper end of the shaft 36 is designed to support a horseshoe magnet 37 with its pole pieces mounted vertically and their ends near the top of the member 14 and close enough to the bar 25 so that as the magnet 37 is rotated, the magnet bar will also be rotated through magnetic influence. The body portion 14, of course, is constructed of non-magnetic material such as brass or aluminum.

The lower end of the shaft 36 is provided with a bevel gear 38 in mesh with a bevel gear 39 mounted on a horizontally arranged shaft 40, rotatively mounted in the lower end of the frame member 34. One end of the shaft 40 extends through the frame member and is bent laterally and provided with a float 41, preferably in the form of a cylinder, the longitudinal axis of the cylinder being mounted at right angles to the arm 40, so that the axis of the cylinder will be parallel with the face of the fuel within the tank.

By this arrangement it will be seen that as the level of the fuel within the tank is varied, the float 41 will be elevated and lowered and the laterally extending portion of the shaft 40 caused to oscillate from a vertical to a horizontal position in either direction, which in turn will cause the shaft 40 to rotate and the shaft 36 to be rotated through the gears 38 and 39. This in turn will cause the magnet 37 to be rotated about its vertical axis and the magnetized bar 25 and the index 28 to correspondingly be moved. The index 28 rests in the position 30 when the laterally extending portion of the shaft 40 is in its vertical position, or when the tank is empty, and the index member 28 is supported at either end of the scale 29 when the said shaft 40 is in a horizontal position, indicating that the tank is full. The pressure index 21 is operated through the Bourdon tube 17 to indicate the air pressure within the tank in the usual manner.

A cylindrical cap 42 is provided for the member 14, the lower edge of which rests on the flange 15. The upper edge of the cap is rolled inwardly and designed to support a window 43.

Thus it will be seen that I have provided a combined fuel and pressure gauge, which may be mounted in a single opening in the fuel tank, and in which the fuel level and the air pressure within the tank may be read independently upon a single dial, and one in which the fuel indicating device may be operated without the use of packing glands which materially reduce the sensitiveness of the device, as well as the liability of leaks to permit the escape of compressed air within the tank. The combined device occupies substantially the same space as the ordinary pressure gauge.

Another advantage of my device lies in the fact that the mechanism for operating the magnetized bar 25 is mounted in a casing, which may be inserted into the body 13 after the working parts of the said mechanism have been assembled in the casing, the casing being retained in the body member by suitable means such as a drop of solder between the lower edge of the member 12 and the casing 34.

I claim as my invention:

In a device of the class described, the combination of a hollow casing, a partition to divide it into upper and lower compartments, a post on the casing projecting into the upper compartment, a Bourdon tube mounted on said post, said casing and post being formed with a passageway communicating between the lower compartment and the Bourdon tube, a pin mounted upon said partition, an index member mounted on said pin, an open ended tube mounted in the lower end of the casing, said tube being provided with an integral inturned central bearing intermediate the ends and near one end thereof and also with a second bearing at the other end thereof, a rotative shaft mounted in said bearings, a float mechanism supported by said tube, means operated by the float mechanism for actuating said shaft, and a magnet at the upper end of the shaft for actuating said index member through the partition.

Des Moines, Iowa, August 25, 1927.

GEORGE FREDRICK RUOPP.